United States Patent
Matsusaka et al.

(10) Patent No.: US 6,547,215 B2
(45) Date of Patent: Apr. 15, 2003

(54) ELECTROMAGNETIC VALVE HAVING NONMAGNETIC MEMBER BETWEEN STATOR CORE AND MOVING CORE

(75) Inventors: Noboru Matsusaka, Kariya (JP); Kenichi Oishi, Okazaki (JP); Kazutoshi Iwasaki, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/782,295

(22) Filed: Feb. 14, 2001

(65) Prior Publication Data

US 2001/0013584 A1 Aug. 16, 2001

(30) Foreign Application Priority Data

Feb. 16, 2000 (JP) .................................. 2000-037789

(51) Int. Cl.[7] .............................................. F16K 31/02
(52) U.S. Cl. .................. 251/129.15; 137/375; 335/278
(58) Field of Search ................. 251/129.15; 137/625.69, 137/375; 335/248, 277, 257, 278

(56) References Cited

U.S. PATENT DOCUMENTS

| | | | | |
|---|---|---|---|---|
| 3,629,755 A | * | 12/1971 | Schaller ................. | 335/277 X |
| 4,262,877 A | * | 4/1981 | Lang ...................... | 251/129.15 |
| 4,509,716 A | * | 4/1985 | Barber et al. .......... | 251/129.15 |
| 4,561,628 A | * | 12/1985 | Matsushima et al. .. | 251/129.15 |
| 4,643,223 A | * | 2/1987 | Abe et al. ............... | 137/375 X |
| 4,744,389 A | * | 5/1988 | Ichihashi ............. | 251/129.15 X |
| 5,145,148 A | * | 9/1992 | Laurent ............. | 251/129.15 X |
| 5,280,873 A | * | 1/1994 | Abrahamsen et al. .. | 251/129.15 |
| 5,715,704 A | * | 2/1998 | Cholkeri et al. ..... | 251/129.15 X |
| 6,105,931 A | * | 8/2000 | Frank et al. ........... | 251/129.15 |
| 6,206,343 B1 | * | 3/2001 | Kato et al. ............. | 251/129.15 |

FOREIGN PATENT DOCUMENTS

| | | |
|---|---|---|
| DE | 44 23 122 | 1/1996 |
| JP | 10-38126 | 2/1998 |
| JP | 10-299932 | 11/1998 |

* cited by examiner

*Primary Examiner*—Gene Mancene
*Assistant Examiner*—Eric Keasel
(74) *Attorney, Agent, or Firm*—Nixon & Vanderhye P.C.

(57) ABSTRACT

A stator core integrally includes a container portion and an attracting portion. The container portion contains and supports a plunger to allow it to reciprocate thereinside. The attracting portion magnetically attracts the plunger. The plunger includes a moving core made of magnetic material, and a nonmagnetic cup fit to the moving core. The cup integrally includes a cylindrical wall covering the outside wall of the moving core, and a bottom covering the lower end of the moving core. Air gap between the moving core and the container portion can be reduced by making the thickness of the cup as thin as possible. Thus, an attracting force for attracting the plunger without increasing winding number of the coil.

4 Claims, 5 Drawing Sheets

ELECTROMAGNETIC VALVE HAVING NONMAGNETIC MEMBER BETWEEN STATOR CORE AND MOVING CORE

CROSS REFERENCE TO RELATED APPLICATION

This application is based on and incorporates herein by reference Japanese Patent Application No. 2000-37789 filed on Feb. 16, 2000.

BACKGROUND OF THE INVENTION

1. Field of the Invention

The present invention relates to an electromagnetic valve for controlling the pressure of a fluid.

2. Description of Related Art

JP-A-10-299932 discloses an electromagnetic valve in which attracting portion of a stator core attracts a moving core when a coil is energized. In the electromagnetic valve, a resin bobbin supports a plunger working as the moving core to allow it to reciprocate thereinside.

However, the resin bobbin is formed independently from a container portion of the stator core, which covers the outer wall of the moving core, so that the axis of the bobbin might deviate from the axis of the container portion. When the axis of the bobbin deviates from the axis of the container portion, the moving core might contact with the container portion to obstruct a reciprocation of the moving core. Thus, an air gap between the moving core and the container portion has to be enlarged for preventing the moving core from contacting the container portion.

However, when the air gap is enlarged, attracting force for attracting the moving core is reduced. For attaining a required attracting force, winding number of the coil has to be increased, thereby enlarging an entire electromagnetic valve.

SUMMARY OF THE INVENTION

An object of the present invention is to increase an attracting force for attracting a moving core without enlarging an entire electromagnetic valve.

According to a first aspect of the present invention, a first stator contains and supports a moving core to allow it to reciprocate thereinside. A second stator magnetically attracts the moving core in a reciprocating direction of the moving core. A nonmagnetic member is provided between one end surface of the moving core, which faces the second stator, and the second stator, and is provided between an outside wall of the moving core and the first stator.

Since the thickness of the nonmagnetic member works as an air gap, an attracting force for attracting the moving core is increased by making the thickness of the nonmagnetic member as thin as possible. Further, since the nonmagnetic member is provided between the moving core and the second stator, there is no need to prepare an additional nonmagnetic stopper for preventing the moving core from contacting the second stator.

According to a second aspect of the present invention, the nonmagnetic member is formed in a cylindrical cup. The cylindrical cup-shaped nonmagnetic member is easily press-formed.

Since the cylindrical cup-shaped nonmagnetic member is press-formed, the nonmagnetic member has a uniform thickness, thereby preventing an irregularity of the air gap.

Further, the cylindrical cup-shaped nonmagnetic member is easily fit to the moving core. The cylindrical cup-shaped nonmagnetic member may be adhered or welded to the moving core.

According to a third aspect of the present invention, the nonmagnetic member is formed in a cylindrical film. The nonmagnetic cylindrical film is elastically and easily attached to the moving core or the first stator.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS (First Embodiment)

Figure 1:
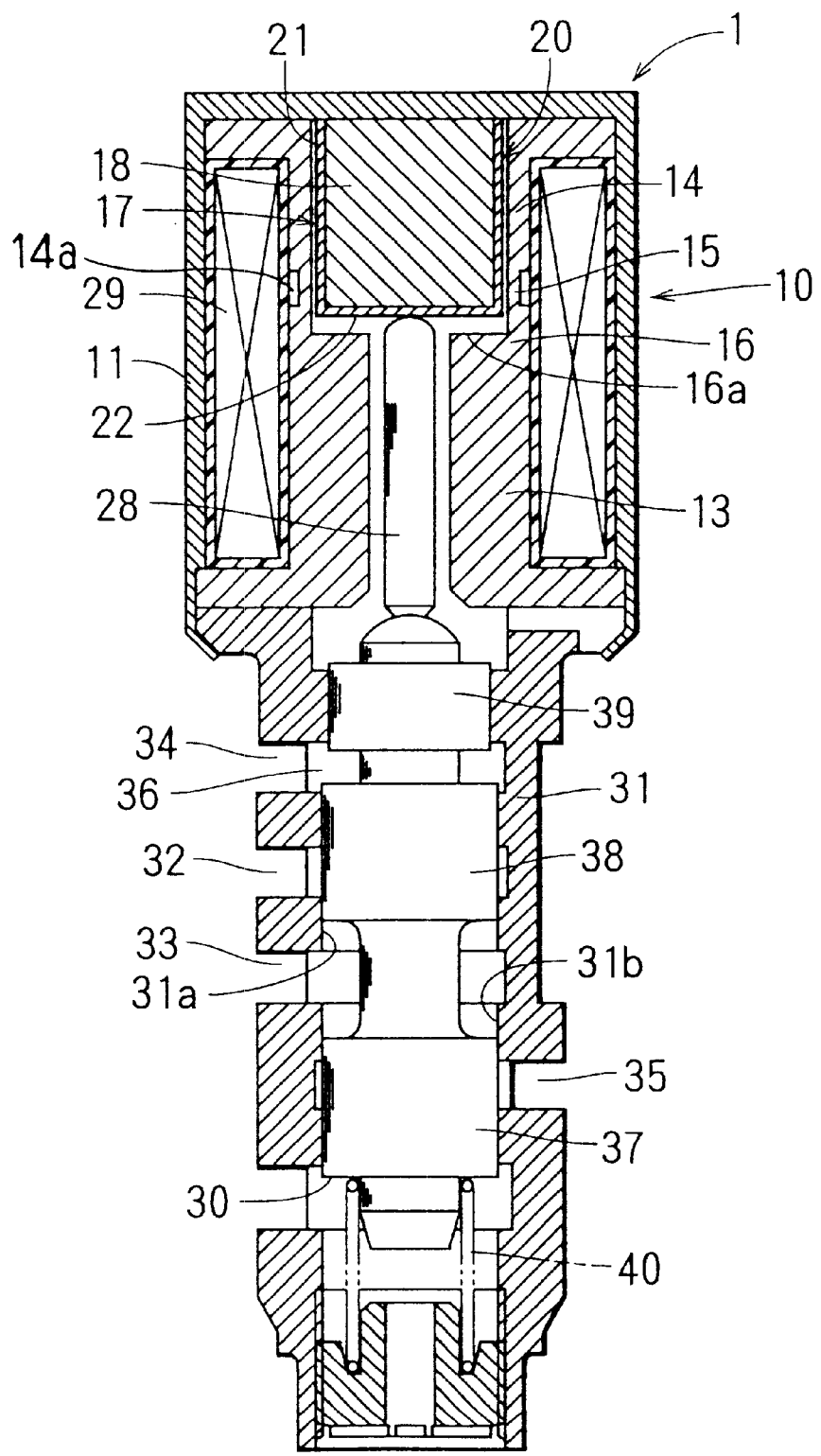
FIG. 1 is a cross-sectional view showing an electromagnetic valve (first embodiment)
Figure 2:
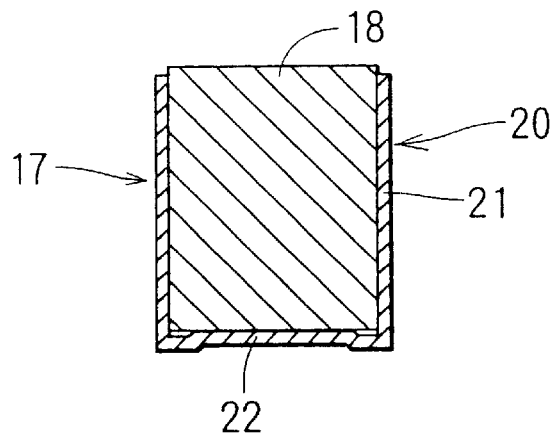
FIG. 2 is a cross-sectional view showing a plunger (first embodiment)

FIGS. 1 and 2 show the first embodiment in which an electromagnetic valve 1 is applied to a spool type oil pressure control valve for controlling the oil pressure of operating oil supplied to an oil pressure control device of an automatic transmission of a vehicle or the like.

A linear solenoid 10 as an electromagnetic driving portion includes a cylindrical cup-shaped yoke 11, stator core 13, a plunger 17, a shaft 28, a coil 29, and the like. The yoke 11, the stator core 13, a moving core 18 of the plunger 18 are made of magnetic material.

A housing 31 supports a spool 30 and allows it to reciprocate therein. The yoke 11 is mechanically fixed to the housing 31, and the stator core 13 is fixed between the yoke 11 and the housing 31.

The stator core 11 integrally includes a container portion 14 as a first stator, and an attracting portion 16 as a second stator. The container portion 14 contains and supports the plunger 17, and allows it to reciprocate therein. The attracting portion 16 generates a force attracting the plunger 17.

Nickel and phosphorus plating is coated on the inner wall of the container portion 14 to reduce a slide resistance between the plunger 17 and the container portion 14. The container portion 14 includes a ring-like groove 14a at the outer wall thereof, and a thin thickness portion 15 as magnetic resistor is formed. Thickness of the thin thickness portion 15 is set to attain a sufficient mechanical strength thereof. The attraction portion 16 defines a stopper 16a facing the plunger 17. When the coil 29 is electrically energized, the attracting portion 16 generates a force attracting the plunger 17.

The plunger 17 includes a moving core 18 made of magnetic material and a cylindrical cup 20 having a bottom 22. As shown in FIG. 2, the cup 20 is press-formed to include a cylindrical wall 21 covering the outside surface of the moving core 18, and the bottom 22 covering the lower end surface of the moving core 18. The cylindrical wall 21 slides with respect to the inner wall of the container portion 14, so that the plunger 17 is supported to reciprocate in the inner wall of the container portion 14. The cup 20 may be only fit to the moving core 18, or may be adhered or welded to the moving core 18.

The upper end of the shaft 28 contacts the bottom 22 of the cup 20, and the lower end of the shaft 28 contacts the upper end of the spool 30.

The coil 29 is molded by resin into a cylindrical shape and is supported by the yoke 11 and the stator core 13. When an electric current is supplied to the coil 29 from a terminal (not illustrated) electrically connected to the coil 29, a magnetic flux is generated in a magnetic circuit including the yoke 11, the plunger 17, and the stator core 13, and a magnetic attracting force is generated between the attracting portion 16 and the plunger 17. Then, the plunger 17 axially downwardly moves in FIG. 1. The downwardly movement of the plunger 17 is restricted by a stopper 16a of the attracting portion 16.

The housing 31 accommodates the spool 30 to allow it to freely reciprocate thereinside. The housing 31 includes an inlet port 33, an outlet port 33, a feedback port 34, and a discharge port 35. The operating oil supplied from an oil tank by an oil pump is introduced into the inlet port 32. The operating oil is supplied to a clutch of an automatic transmission through the outlet port 33. The outlet port 33 communicates with the feedback port 34 at the outside of the electromagnetic valve 1. Some operating oil flowing out of the outlet port 33 is introduced into the feedback port 34. A feedback chamber 36 communicates with the feedback port 34. The operating oil is discharged into the oil tank through the discharge port 35.

A first large-diameter land 37, a second large-diameter land 38, and a small-diameter land 39 are formed in the spool 30 in this sequence from the lower side of the spool 30. The small-diameter land 39 has an outer diameter smaller than the large-diameter lands 37 and 38. Since the spool 30 always contacts the shaft 28 of the linear solenoid 10, the spool 30 receives the movement of the plunger 17 through the shaft 28 to reciprocate in the housing 31.

A spring 40 is provided at the lower end of the spool 30. The spring 40 upwardly urges the spool 30 toward the linear solenoid 10 (i.e., spring 40 serves as an exemplary urging means for urging spool 30 toward the linear solenoid 10).

The feedback chamber 36 is formed between the first large-diameter land 38 and the small-diameter land 39, and areas on which a fed back oil pressure acts vary in accordance with the difference of the outer diameters of the lands 38 and 39. Thus, the oil pressure inside the feedback chamber 36 urges the spool 30 downwardly. Some oil pressure output from the electromagnetic valve 1 is fed back in order to prevent output pressure from fluctuating by the fluctuation of supplied oil pressure, that is, input pressure. The spool 30 is placed where the urging force of the spring 40, the pushing force of the plunger 17 against the spool 30, and the force caused by the oil pressure inside the feedback chamber 36 are balanced.

An operation of the electromagnetic valve 1 will be explained operating oil amount from the inlet port 32 to the outlet port 33 is adjusted in accordance with a seal length. The seal length is a length of an overlapping part between an inner wall 31a of the housing 31 and an outer wall of the second large-diameter land 38. When the seal length becomes short, the operating oil amount from the inlet port 32 to the outlet port 33 increases. When the seal length becomes long, the operating oil amount from the inlet port 32 to the outlet port 33 decreases. Similarly, operating oil amount from the outlet port 33 to the discharge port 35 is adjusted in accordance with a seal length between an inner wall 31b of the housing 31 and an outer wall of the first large-diameter land 37.

When the electric current supply into the coil 14 is shut-off, the spool 30 is placed at the position where the urging force of the spring 40 and the force acting by the feedback oil pressure are balanced with each other. Then, the inlet port 32 communicates with the outlet port 33, and the amount of the operating oil flowing from the inlet port 32 to the outlet port 33 is increased. Here since the discharge port is closed, pressure of the operating oil supplied into the automatic transmission becomes the maximum.

Since the thin thickness portion 15 works as a magnetic resistor, the magnetic flux generated by the electric current supplied into the coil 29 hardly flows between the container portion 14 and the attracting portion 16. Thus, when the electric current is supplied into the coil 29, most of the magnetic flux does not flow through the thin thickness portion 15, and flows between the container portion 14 and the plunger 17, and between the attracting portion 16 and the plunger 17, and the attracting portion 16 attracts the plunger 17. Whereby, the spool 30 downwardly moves toward the spring 40, the seal length between the inner wall 31a and the second large-diameter land 38 becomes long, and the seal length between the inner wall 31b and the first large-diameter land 37 becomes short. Thus, the amount of the operating oil from the inlet port 32 to the outlet port 33 decreases, and the amount of the operating oil from the outlet port 33 to the discharge port 35 increases. As a result, the pressure of the operating oil flowing out of the outlet port 33 decreases.

When the electric current supplied into the coil 20 is reduced and the force attracting the plunger 17 is reduced, the spool 30 upwardly moves toward the linier solenoid 10, the seal length between the inner wall 31a and the second large diameter land 38 becomes short, and the seal length between the inner wall 31b and the first large-diameter land 37 becomes long. Thus, the amount of the operating oil from the inlet port 32 to the outlet port 33 increases, and the amount of the operating oil from the outlet port 33 to the discharge port 35 decreases. As a result, the pressure of the operation oil flowing out of the outlet port 33 is increased.

In the electromagnetic valve 1, the electric current supplied into the coil 29 is controlled to adjust the force of the linear solenoid 10 pushing the spool 30 downwardly, thereby adjusting the pressure of the operating oil flowing out of the outlet port 33. When the electric current supplied into the coil 40 is increased, electromagnetic attracting force of the stator core 13 increased in proportion to the electric current value, thereby increasing a force of the shaft 28 pushing the spool 30 downwardly. The spool 30 is places at the position where the force of the plunger 17 acting on the spool 30, the urging force of the spring 40, and the feedback operating oil pressure pushing the spool 30 downwardly are balanced. Therefore, the pressure of the operating oil flowing out of the outlet port 33 decreases in proportion to the electric current supplied into the coil 29.

In the first embodiment, the cup 20 covers the moving core 18 to form the plunger 17, and the container portion 14 on which the nickel-phosphorus plating is coated supports the plunger 17 to allow it to slide therein. Air-gap, between the moving core 18 and magnetic portion of the container portion 14 from which the plating is removed, can be reduced by making the thickness of the cup 20 and the nickel-phosphorus plating as thin as possible. Therefore, the attracting force for attracting the plunger 17 is increased without increasing the winding number of the coil 29.

Since the plating is coated on the inner surface of the container portion 14, the slide resistance between the container portion 14 and the plunger 17 is reduced. Thus, since a slide resistance difference between when the plunger 17 moves up and moves down, the electric current supplied into the coil 29 controls the displacement of the plunger 17.

Since the bottom 22 of the cup 20 covers the lower end of the moving core 18, there is no need to prepare an additional nonmagnetic part preventing the moving core 18 from contacting the stopper surface 16a of the attracting portion 16. The number of parts is reduced, thereby reducing assembling processes. Further, there is no need to abrade a coating that is laminated on the outer wall of the moving core 18 instead of the cup, so that manufacturing processes are reduced.

(Second Embodiment)

Figure 3:
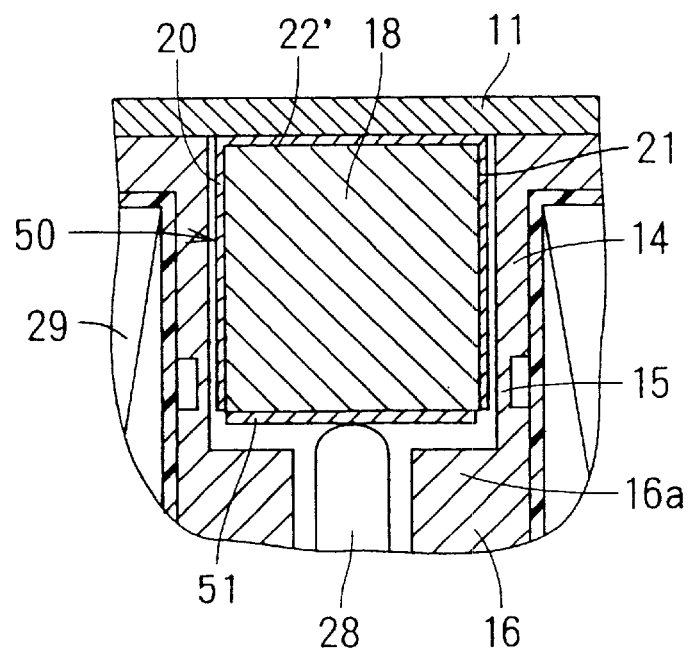
FIG. 3 is a cross-sectional view showing around a plunger (second embodiment)

In the second embodiment, as shown in FIG. 3, the plunger 50 includes a moving core 18, a cup 20, and a stopper 51. A bottom 22' of the cup 20 covers the upper end of the moving core 18. The stopper 51 is made of nonmagnetic plate, and adhered or welded to the lower end surface of the moving core 18.

(Third Embodiment)

Figure 4:
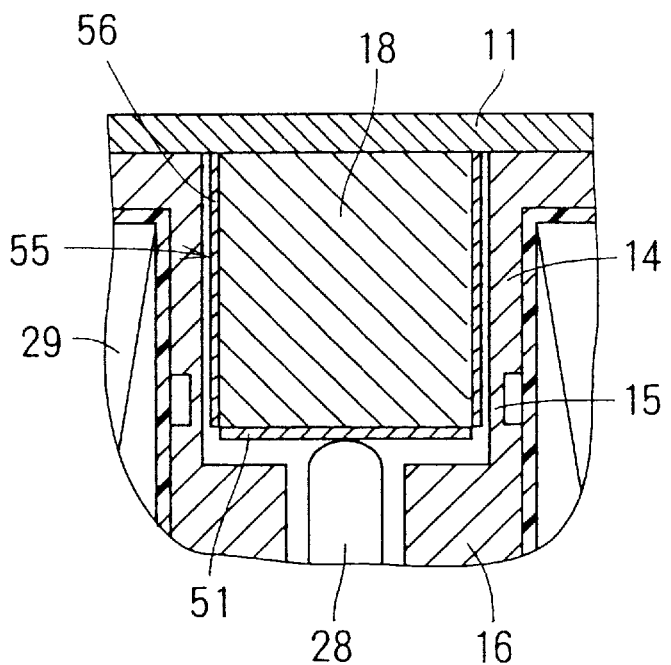
FIG. 4 is a cross-sectional view showing around a plunger (third embodiment)
Figure 5:
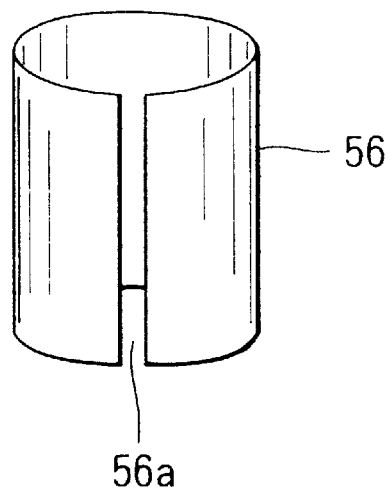
FIG. 5 is a perspective view showing a cylindrical film (third embodiment)

In the third embodiment, as shown in FIGS. 4 and 5, a plunger 55 includes a moving core 18, a cylindrical film 56, and a stopper 51. The cylindrical film 56 is, as shown in FIG. 5, formed by cylindrically rolling a nonmagnetic rectangular film. Before the cylindrical film 56 is fit to the moving core 18, the cylindrical film 56 has an axial gap 56a, and inner diameter of the cylindrical film 56 is set smaller than the outer diameter of the moving core 18. Thus, the cylindrical film 56 is elastically fit to the moving core 18. The cylindrical film 56 may be fit to the moving core 18 by only elastic force, or may be adhered or welded to the moving core 18.

(Fourth Embodiment)

Figure 6:
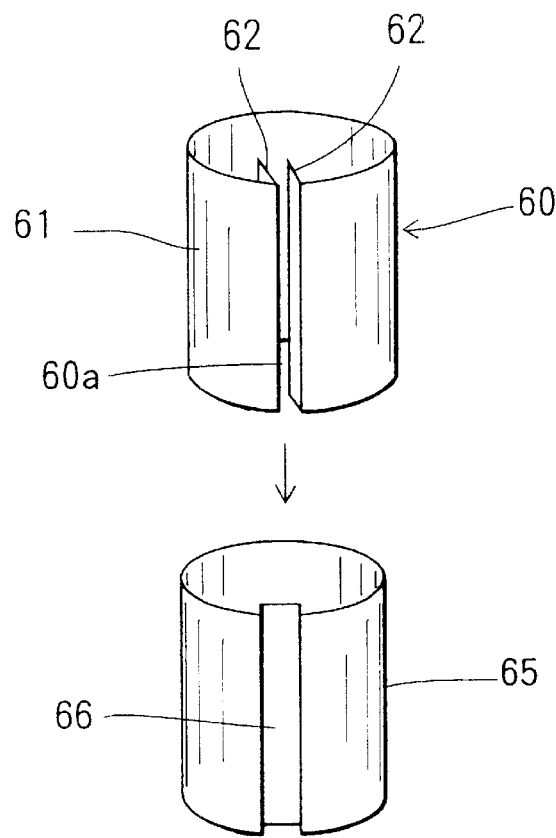
FIG. 6 is a perspective view showing a cylindrical film and a moving core (fourth embodiment)

In the fourth embodiment, as shown in FIG. 6, a cylindrical film 60 is made of nonmagnetic material and includes a cylindrical wall 61 and both ends 62 forming an axial gap 60a. The both ends 62 are bent radially inwardly. A moving core 65 has an axial groove 66. The both ends 62 of the cylindrical film 60 are fit to the axial groove 66, and the cylindrical film 60 is attached to the moving core 65.

(Fifth Embodiment)

Figure 7:
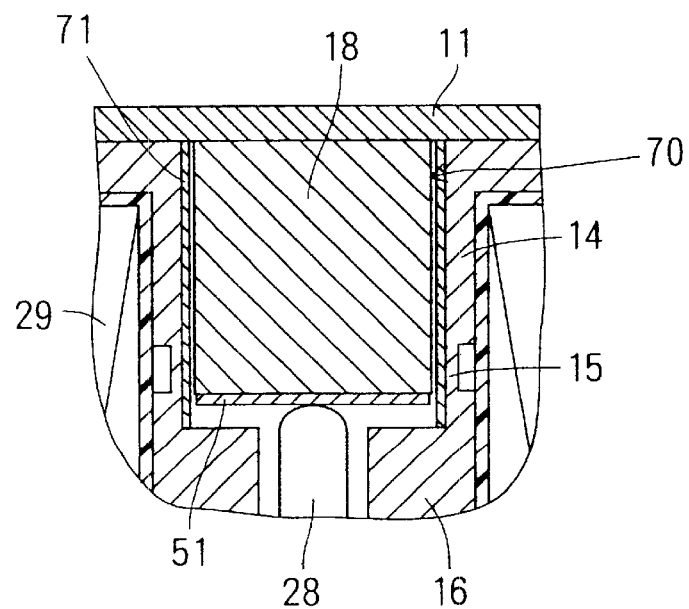
FIG. 7 is a cross-sectional view showing around a plunger (fifth embodiment)

In the fifth embodiment, as shown in FIG. 7, a plunger 70 includes a moving core 18 and a stopper 51. A cylindrical film 71 is made of nonmagnetic material, and includes an axial gap (not illustrated). Before the cylindrical film 71 is attached to the container portion 14, outer diameter of the cylindrical film 71 is set larger than the inner diameter of the container portion 14. Thus, the cylindrical film 71 is elastically fit to the inner wall of the container portion 14. Here, the cylindrical film 71 may be fit to the inner wall of the container portion 14 by only elastic force, or may be adhered or welded to the container portion 14.

(Sixth Embodiment)

Figure 8:
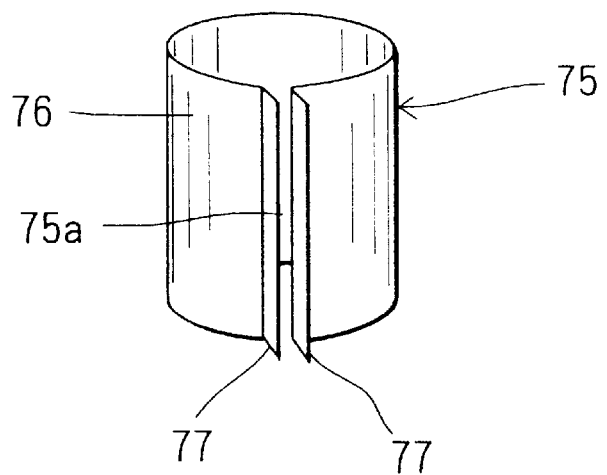
FIG. 8 is a perspective view showing a cylindrical film (sixth embodiment)

In the sixth embodiment, as shown in FIG. 8, a cylindrical film 75 attached to the inner wall of the container portion 14 is made of nonmagnetic material. The cylindrical film 75 includes a cylindrical wall 76 and both ends 77 forming an axial gap 75a. The both ends 77 are bent radially inwardly. The inner wall of the container 14 includes an axial groove (not illustrated). The both ends 77 of the cylindrical film 75 are fit to the axial groove, and the cylindrical film 75 is attached to the container portion 14.

(Seventh Embodiment)

Figure 9:
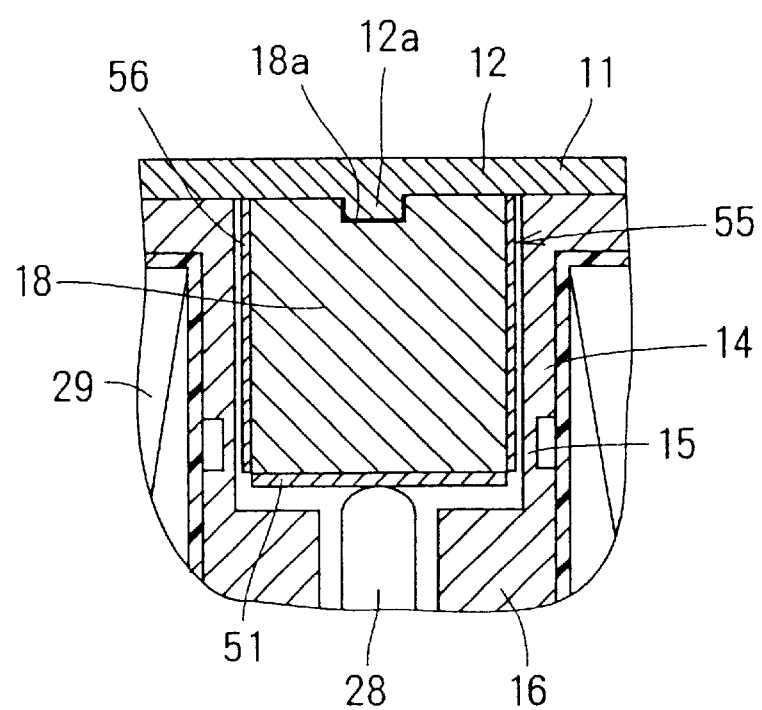
FIG. 9 is a cross-sectional view showing around a plunger (seventh embodiment).

In the seventh embodiment, as shown in FIG. 9, a bottom 12 of the yoke 11 in the third embodiment includes a projection 12a. The moving core 18 includes a concave 18a into which the projection 12a is fit, at the upper end surface thereof. When the plunger 55 is attached to the yoke 11, the concave 18a is fit to the projection 12a, so that the moving core 18 is easily positioned with respect to the yoke 11. Alternatively, the bottom 12 may have a concave, and the moving core may have a projection.

According to the above-described embodiments, the container portion 14 and the attracting portion 16 are integrally formed within the stator core 13. The cup 20 or the cylindrical film made of nonmagnetic film covers the container portion 14 or the moving core 18. The container portion 14 supports the plunger 17 while allowing it to slide. Thus, the radial air gap between the moving core 18 and the container portion 14 is made as small as possible, thereby increasing the attracting force of the plunger without enlarging the size of the electromagnetic valve.

(Modifications)

According to the above-described embodiments, the container portion 14 and the attracting portion 16 are integrally formed within the stator core 13. Alternatively, the container portion 14 may be separated from the attracting portion 16.

According to the above-described embodiments, the electromagnetic valve in the present invention is applied to a spool type oil pressure control valve. Alternatively, as long as the attracting force is increased without enlarging the size thereof, the electromagnetic valve in the present invention may be applied to other type electromagnetic valves.

What is claimed is:

1. An electromagnetic device, comprising:

a moving core made of magnetic material;

a stator core having a container portion, a thin wall portion and an attraction portion, the container portion, the thin wall portion and the attraction portion being formed integrally with a continuous magnetic material, the container portion containing and supporting said moving core therein, said moving core being movably supported in a reciprocating direction, the attraction portion defining a stopper facing an axial end surface of the moving core contained in the container portion and magnetically attracting said moving core in the reciprocating direction of said moving core, and the thin wall portion being provided as a magnetic resistor between the container portion and the attraction portion for magnetically partitioning therebetween;

a coil disposed on an outside of the container portion, the coil being electrically energized to generate a magnetic force for attracting said moving core toward said attraction portion; and a cylindrical cup-shaped nonmagnetic member attached on said moving core so as to be movable therewith, the cylindrical cup-shaped nonmagnetic member covering said axial end surface of said moving core facing the stopper, an entire outside surface of said moving core which faces an inner surface of said container portion, and a edge between said axial end surface and said outside surface.

2. The electromagnetic device according to claim 1, wherein the other axial end surface of said moving core includes one of a projection and a concave, and a member facing the other end surface of said moving core includes the other one of a projection and a concave fitting to said one of the projection and the concave of the other axial end surface of said moving core.

3. The electromagnetic device according to claim 1, wherein a plating is coated on an inner wall of said container portion, which faces said moving core, for reducing a slide resistance between said cylindrical cup-shaped nonmagnetic member and the inner wall of said container portion.

4. The electromagnetic device according to claim 1, further comprising:

a cylindrical housing including a plurality of fluid passages penetrating through a peripheral wall thereof;

a valve member reciprocating with said moving core for switching communications among the plurality of fluid passages; and an urging means for urging said valve member in a direction opposite to the magnetic force attracting said moving core.

* * * * *